United States Patent [19]
LoRusso et al.

[11] Patent Number: 5,377,654
[45] Date of Patent: Jan. 3, 1995

[54] SYSTEM USING TIME RESOLVED AIR/FUEL SENSOR TO EQUALIZE CYLINDER TO CYLINDER AIR/FUEL RATIOS WITH VARIABLE VALVE CONTROL

[75] Inventors: Julian A. LoRusso, Grosse Ile; Jeffrey A. Cook, Dearborn; Peter S. Szpak; Jessy W. Grizzle, both of Ann Arbor, all of Mich.

[73] Assignee: Ford Motor Company, Dearborn, Mich.

[21] Appl. No.: 974,748

[22] Filed: Nov. 12, 1992

[51] Int. Cl.⁶ .............................. F02D 41/14
[52] U.S. Cl. ..................... 123/673; 123/692
[58] Field of Search ............ 123/673, 692, 90.11, 123/90.12

[56] References Cited

U.S. PATENT DOCUMENTS

| | | | |
|---|---|---|---|
| 4,000,756 | 1/1977 | Ule et al. | 137/596.17 |
| 4,009,695 | 3/1977 | Ule | 123/90.13 |
| 4,206,728 | 6/1980 | Trenne | 123/90.12 |
| 4,615,306 | 10/1986 | Wakeman | 123/90.16 |
| 4,674,451 | 6/1987 | Rembold et al. | 123/90.16 |
| 4,696,265 | 9/1987 | Nohira | 123/90.16 |
| 4,716,863 | 1/1988 | Pruzan | 123/90.15 |
| 4,796,573 | 1/1989 | Wakeman et al. | 123/90.16 |
| 4,930,465 | 6/1990 | Wakeman et al. | 123/90.12 |
| 4,962,741 | 10/1990 | Cook et al. | 123/673 |
| 4,974,566 | 12/1990 | LoRusso et al. | 123/308 |
| 5,115,782 | 5/1992 | Klinke et al. | 123/90.11 |

OTHER PUBLICATIONS

"Valve Timing For Control Of Oxides Of Nitrogen (NO$_x$)", Max A. Freeman, et al, SAE Publication No. 720121, Jan. 10–14, 1972.

*Primary Examiner*—Andrew M. Dolinar
*Attorney, Agent, or Firm*—Roger L. May; Allan J. Lippa

[57] ABSTRACT

A control apparatus and method for maintaining equal air flow among cylinders and independently controlling the air/fuel ratio of each individual cylinder, in an internal combustion engine having variable valve control. An air fuel controller generates valve control signals for each individual cylinder by sampling the exhaust gas oxygen sensor, and correlating the samples with corresponding combustion events. The valve lift for each variable lift valve is corrected to operate each cylinder at the desired air flow and air/fuel ratio. The variable valve lift can be accomplished in a camshaft type system incorporating a lost motion mechanism or similar device, or a system incorporating direct electrohydraulic or electromechanical valve actuation without a camshaft. The system and method can provide further flexibility in cylinder to cylinder air/fuel ratio control by combining it with a variable pulse width electronic fuel injector capability.

15 Claims, 5 Drawing Sheets

SYSTEM USING TIME RESOLVED AIR/FUEL SENSOR TO EQUALIZE CYLINDER TO CYLINDER AIR/FUEL RATIOS WITH VARIABLE VALVE CONTROL

TECHNICAL FIELD

This invention relates to feedback control systems for controlling air/fuel ratios in individual cylinders, particularly to systems using a time resolved exhaust gas oxygen sensor in the exhaust combined with variable valve control, and also fuel injector pulse width control.

BACKGROUND OF INVENTION

In a typical internal combustion engine, the valve movements are controlled mechanically by a camshaft, with predetermined and unchangeable movements. This type of system is limited in that the valve lift and timing is not optimal for every engine operating condition, causing increased parasitic losses which are primarily due to air throttling. Also, this limitation may cause a non-stoichiometric air/fuel ratio. The stoichiometric value is typically an air/fuel ratio of 14.6 pounds air per 1 pound of fuel. This proper air/fuel ratio is critical in minimizing harmful pollutants in the exhaust, such as $NO_x$, CO and HC, especially when the air pollution reduction is accomplished via a three way catalyst.

As a result, advances have been made that allow for variable valve lift of the individual valves, in order to better optimize the valve timing and lift schedules over the complete engine operating range, resulting in reduced throttling losses and improved air/fuel ratios. Examples of this are the lost motion type of system as shown in U.S. Pat. No. 4,930,465 Wakeman et al., or the electronic actuation of valves as shown in U.S. Pat. No. 4,009,695 Ule, or other variable valve lift systems known in the art.

While this type of system improves the fuel economy and performance for various operating conditions, differences may exist in the valve lifts between cylinders. Hence, the variation of time dependent valve open area between cylinders would result in differences in air flow between cylinders due to the intake process or differences in residual gas content between cylinders due to the exhaust process. A sensor or sensors could be added to monitor the valve lift cylinder to cylinder. However, the problem with this concept is two fold. First, even though key valve lift parameters may indicate equal lift, i.e., valve open time, close time and maximum lift, the shape of the lift curves could be different from cylinder to cylinder yielding different time dependent area during the intake process and hence different air flows. Second, addition of these sensors would involve extra cost and would require equalized calibration cylinder to cylinder to be accurate.

Without a valve lift equalization means, only an average valve lift correction can be applied to all cylinders equally, based on an average air/fuel ratio among the cylinders. In addition to differences in a flow caused by a variable valve cam system, there are additional variations of air/fuel ratios between the cylinders, due to manufacturing tolerances, induction system dynamics, fuel injector clogging and temperature effects. Therefore, the air/fuel ratio may not be optimum for a given cylinder even though the average among the cylinders is the desired value. Further, the average valve lift correction could produce significant air flow differences among the cylinders due to different shapes of the lift curves. This would result in torque differences among the cylinders which will increase noise, vibration and harshness.

One approach to maintaining the desired air/fuel ratios is described in U.S. Pat. No. 4,962,741 Cook et al. In this approach, a time resolved exhaust gas oxygen sensor placed in the combined exhaust stream, i.e., the exhaust stream containing exhaust from all cylinders, generates a signal which is read by a controller. This controller identifies the individual cylinder contributions to the total air/fuel ratio and correlates these with a corresponding combustion event. The controller will then generate a fuel pulse width signal for each individual electronically actuated fuel injector coupled to its corresponding cylinder, thus allowing each cylinder to operate at a desired air/fuel ratio. Once a variable valve system is incorporated, the potential for significantly larger variations in air flow among the cylinders increases to such an extent that mere fuel injector pulse width adjustments, even if they have the ability to adjust the air/fuel ratio to the correct level, may cause significant torque differential among the cylinders due to these air flow variations among the cylinders. The variable valve system removed the compromises present with the cam driven valve train; however, the ability to control valve motion introduces the need for some means of feed back control to be assured that the valve control system was delivering an equal amount of air to each cylinder and leaving an equal amount of residual gasses.

The invention herein recognizes the limitations of the prior art and combines variable valve lift capabilities into a system along with the capabilities of a time resolved oxygen sensor and controller to provide the capability to adjust the air/fuel ratios between the individual cylinders, to maintain equal indicated mean effective pressure levels in each cylinder, to a greater extent should engine operating conditions and air/fuel maldistribution due to manufacturing tolerances warrant. This can be done without the need for any sensors to directly measure the valve lift in any of the variable lift valves, which will reduce cost to the system and may be more reliable because a single sensor or dual sensors are used versus multiple sensors mounted on each valve. In addition, this system can be further combined with the electronically actuated fuel injectors to provide for even more flexibility in maintaining the proper equal air flow among the cylinders and proper air/fuel ratio within each individual cylinder when the valve lift is at a maximum, then the fuel injector pulse width variations can be used to obtain the desired air/fuel ratios within each cylinder.

SUMMARY OF INVENTION

The present invention contemplates a system for maintaining the desired air/fuel ratios within each individual cylinder of a multi cylinder engine with variable lift intake valves and equalizing air flow into each cylinder, in order to reduce throttling losses and improve emissions. The present invention also contemplates a method of operating this system which includes: sensing the oxygen ratio of a combined exhaust gas stream from a plurality of cylinders using a high speed sensor which generates a composite air/fuel ratio signal; monitoring the engine rotational position and cycle, to generate an engine event signal; analyzing the composite air/fuel ratio and engine event signals, and generating the individual cylinder air/fuel ratio signal; and controlling the air flow of each cylinder using variable lift intake valves in response to the individual cylinder air/fuel ratio signals of each cylinder, to adjust the air flow into each cylinder and thereby correct the air/fuel ratio.

The present system also contemplates an apparatus and method of operation wherein variable pulse width fuel injectors are also used along with the variable valve lift to maintain the desired cylinder to cylinder air/fuel ratios. Other features, objects, and advantages of the present invention are readily apparent from the following detailed description of the best mode for carrying out the invention when taken in connection with the accompanying drawings.

BEST MODE FOR CARRYING OUT THE INVENTION

Figure 1:
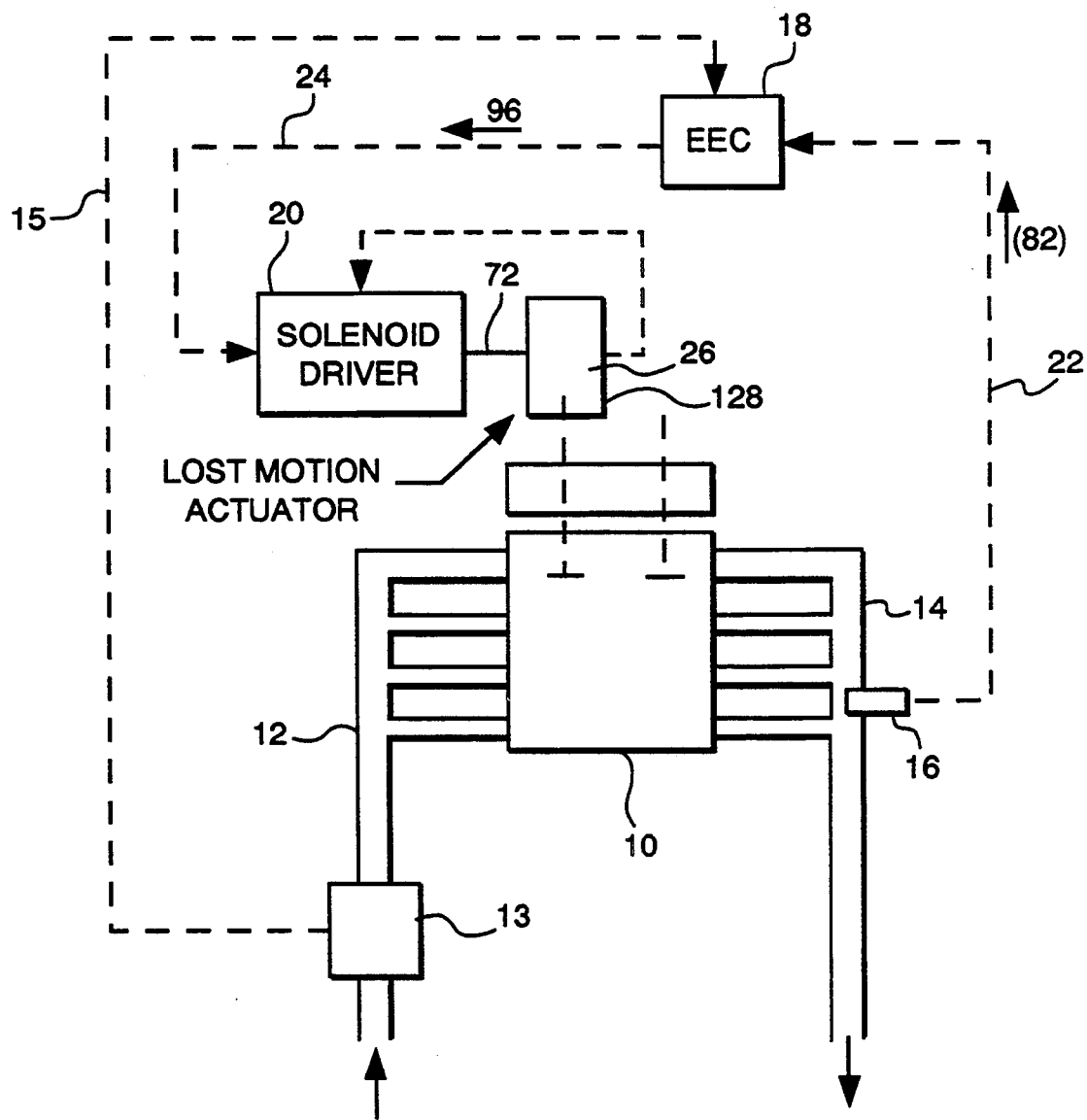
FIG. 1 is a block diagram of the overall control system.

Referring to FIG. 1, the four cylinder internal combustion engine 10 is coupled between the intake manifold 12 and exhaust manifold 14. The intake valves 28 are interposed between the intake manifold 12 and their respective cylinders, not shown, in the engine 10 in order to control the flow of air from the intake manifold 12 to the cylinders in the engine 10. Mounted to the intake manifold 12 is an air flow meter 13 which measures the amount of air flowing through the intake manifold 12. This air flow meter 13 is electronically coupled to the electronic engine control (EEC) microprocessor 18 via lead 15 so that the air flow measurement can be used by the EEC microprocessor 18 to determine the mass air flow (MAF). Mounted to the exhaust manifold 14 and located within the exhaust stream, which is the gas flowing from the engine 10 out through the exhaust manifold 14, is a high speed exhaust gas oxygen (EGO) sensor 16. This sensor 16 is coupled via lead 22 to the electronic engine control unit microprocessor 18. A solenoid driver 20 is in turn coupled to the EEC microprocessor 18 via lead 24. The solenoid driver 20 is coupled to a variable valve lift mechanism 26, such as a lost motion actuator as in U.S. Pat. No. 4,930,465 Wakeman et al., or as in U.S. Pat. No. 5,127,375 Bowman et al., herein incorporated by reference, or other suitable device. The variable valve lift mechanism 26 engages the intake valves 28 in order to control the amount of valve lift, thus regulating the amount and timing of air entering each cylinder of the engine 10. This concept is not limited to a lost motion type variable valve control system. It applies to any variable valve control system that introduces new manufacturing tolerance effects or air distribution between cylinders, such as electrohydraulic or electromechanical systems.

Figure 3:
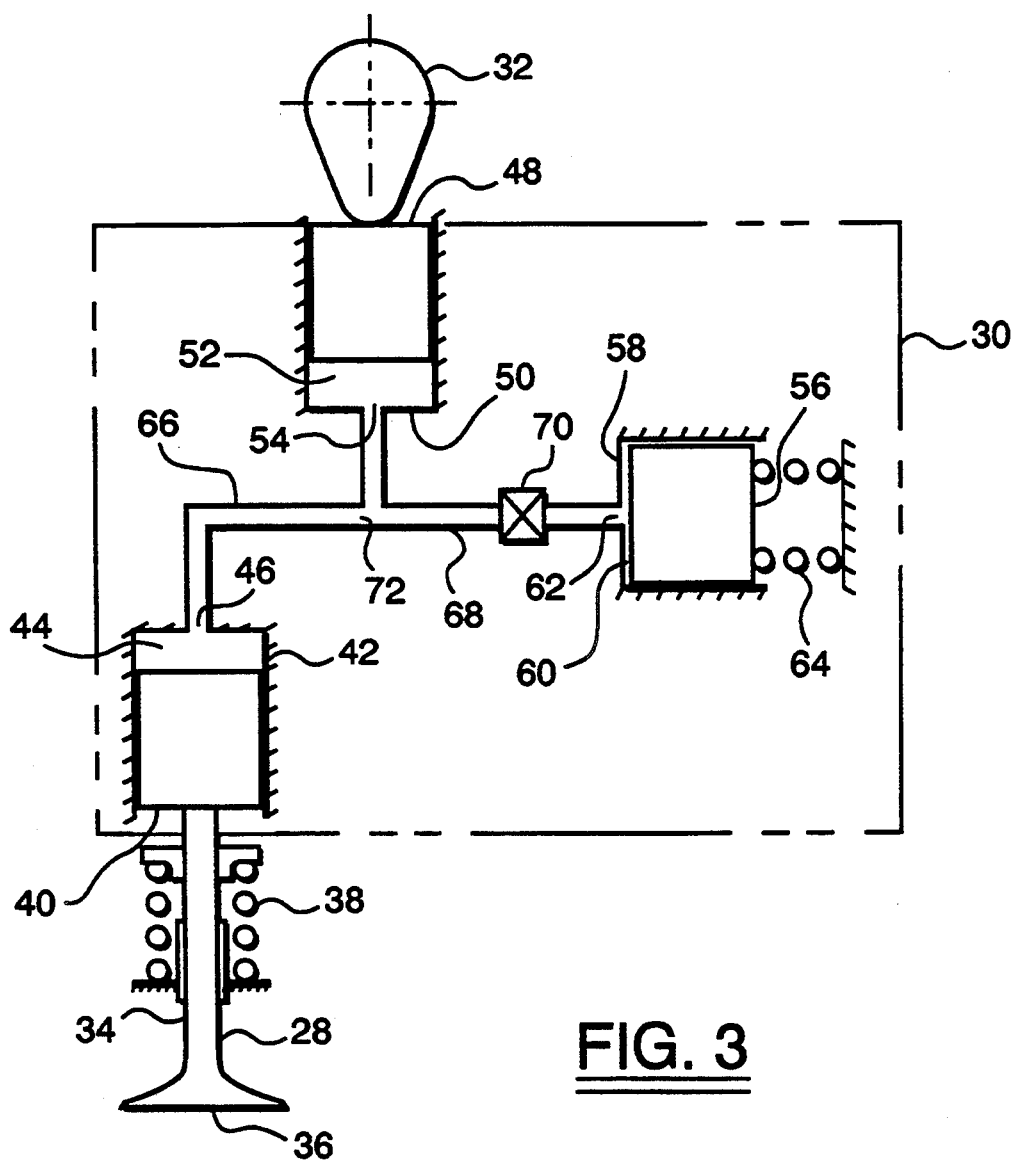
FIG. 3 is schematic of a lost motion variable valve lift system.

FIG. 3 shows a lost motion actuator mechanism 30, as an embodiment of the variable valve lift mechanism 26 shown in FIG. 1, interposed between a cam 32, fixed to a camshaft not shown, and an intake valve 28. The intake valve consists of a valve stem 34 with a head 36 at one end. A valve spring 38 is coupled to the intake valve 28, which biases the intake valve 28 in the closed position. The closed position refers to the position in which the intake valve 28 blocks any air from flowing between the intake manifold 12 and the cylinder, not shown, in the engine 10.

The lost motion actuator mechanism 30 consists of three interconnected plunger/oil chamber subassemblies. The valve plunger 40 is positioned at the opposite end of the valve stem 34 from the valve head 36, and engages the valve stem 34. This valve plunger 40 is fitted within an oil chamber 42 to allow movement longitudinally within the oil chamber 42, without allowing for fluid to pass between the valve plunger 40 and the inner wall of the oil chamber 42. Movement of the valve plunger 40 allows for a cavity 44 to form within the oil chamber 42. At the end of the oil chamber 42 in which the cavity 44 can form, is an outlet 46 through which fluid can flow.

The cam plunger 48 is positioned so as to engage the cam 32. This cam plunger 48 is fitted within an oil chamber 50 to allow longitudinal movement within the oil chamber 50, without allowing for fluid to pass between the cam plunger 48 and the inner wall of the oil chamber 50. Movement of the cam plunger 48 allows for a cavity 52 to form within the oil chamber 50. At the end of the oil chamber 50 in which the cavity 52 can form, is an outlet 54 through which fluid can flow.

The oil reservoir plunger 56 is fitted within the oil reservoir chamber 58 to allow longitudinal movement of the oil reservoir plunger 56 within the oil reservoir chamber 58, without allowing fluid to pass between the oil reservoir plunger 56 and the inner wall of the oil reservoir chamber 58. Movement of the oil reservoir plunger 56 allows for a cavity 60 to form within the oil reservoir chamber 58. At the end of the oil reservoir chamber 58 in which the cavity 60 can form, is an outlet 62 through which fluid can flow. At the opposite end of the oil reservoir chamber 58 from the outlet 62 is the oil reservoir spring 64, which is weaker than the valve spring 38. This spring 64 is biased against the oil reservoir plunger 56 so as to reduce the oil reservoir chamber 58.

A first conduit 66 connects the oil chamber outlet 46 to the oil chamber outlet 54, thereby allowing fluid to flow between the corresponding oil chambers 42, 50. A second conduit 68 connects the oil reservoir cavity outlet 62 to the first conduit 66 intermediate of the two oil chamber outlets 46, 54, thereby allowing fluid to flow between the first conduit 66 and the second conduit 68. The solenoid valve 70 is coupled to the second conduit 68 in such a way that when the solenoid valve 70 is closed, no fluid can flow between the oil reservoir chamber 58 and the first conduit 66, but when it is open the fluid can freely flow. The solenoid valve is connected via lead 72 to the solenoid driver 20, shown in FIG. 1. The lost motion actuator system has a predetermined total amount of fluid 72, in this example oil, within the three oil chamber cavities 44, 52, 60 and the two conduits 66, 68.

When the solenoid valve 70 is closed, the lost motion actuator mechanism 30 has no effect on the relative motion between the cam 32 and the intake valve 28. The intake valve 28 acts as if the cam 32 was directly engaging the valve stem 34 because as the cam 32 pushes down on the cam plunger 48, the fluid 72 in the oil chamber cavity 52 is pushed out into the first conduit 66 which in turn forces this fluid 72 into the oil chamber cavity 44 thereby pushing the valve plunger 40 against the valve stem 34 causing the valve to open.

On the other hand, while the solenoid valve 70 is open, the fluid 72 forced out of oil chamber cavity 52 flows from the first conduit 66 into the second conduit 68 and fills oil cavity 60, forcing oil reservoir plunger 56 to push against the weak oil reservoir spring 64. Consequently, the timing of the opening and closing of the solenoid valve 70 will control the reduction in the motion of the intake valve 28 from its maximum. The maximum motion is when the solenoid valve 70 remains closed throughout a cam 32 rotation. The solenoid valve 70 is activated by the solenoid driver 20, which in turn is electrically linked to the EEC microprocessor 18, shown in FIG. 1. Differences in valve lift could be caused by solenoid manufacturing differences, such as different clearances between the valve plunger 40 and oil chamber 42, between the cam plunger 48 and oil chamber 50, or the oil reservoir plunger 56 and oil reservoir chamber 58, due to different clearances and leakages during operation.

Figure 2:
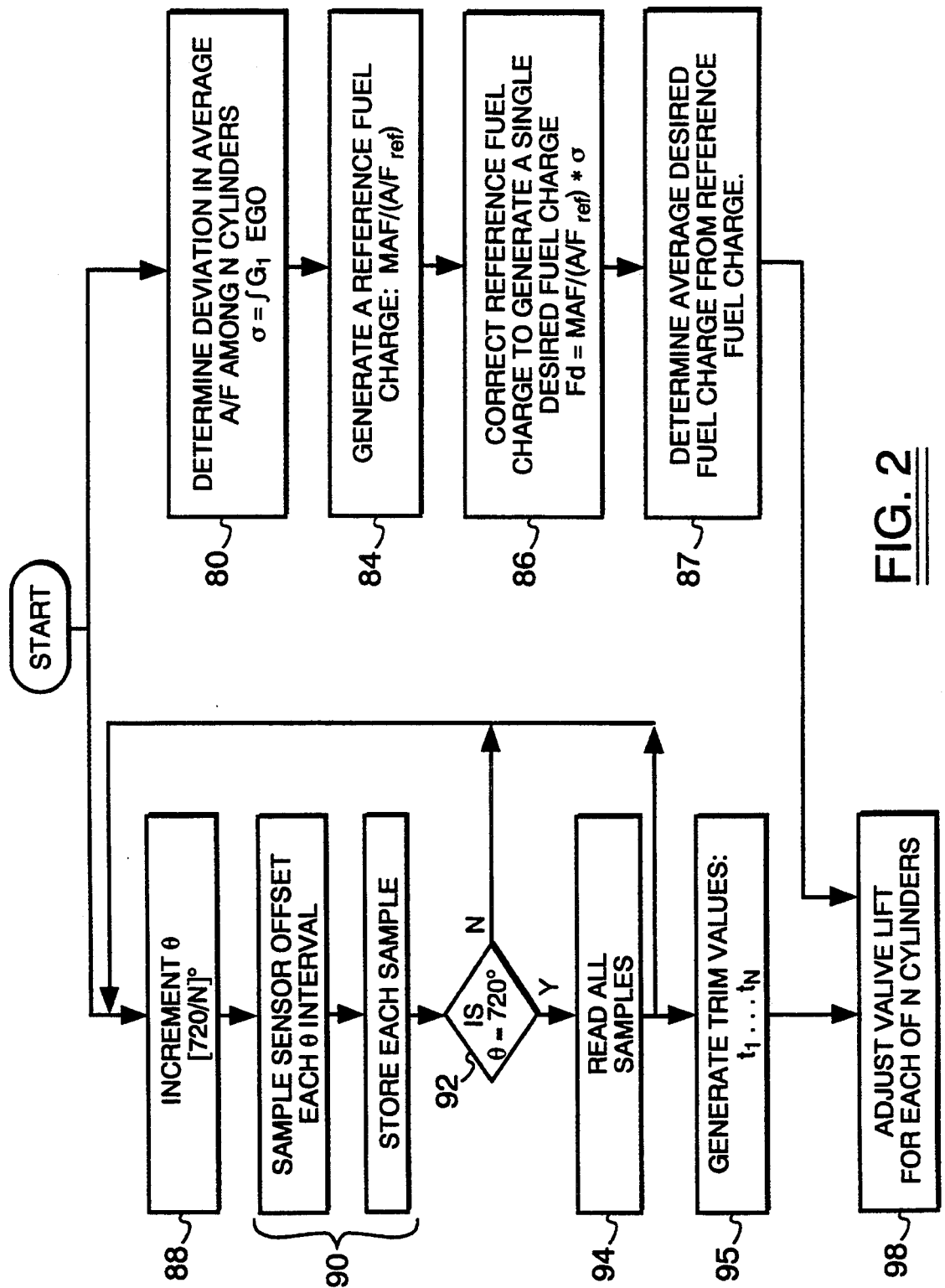
FIG. 2 is a flow diagram of process steps performed by the embodiment shown in FIG. 1.

FIG. 2 shows a flow chart of the steps used by the EEC microprocessor 18 to determine when the solenoid driver 20 should activate each solenoid valve 70, in order to obtain the proper valve lift for a desired air flow among the cylinders and air/fuel ratio. Two separate series of calculations are made in order to determine the amount of valve lift required for each individual intake valve 28. The average desired fuel charge (fd) among the cylinders is determined, and also the individual variation of valve lift needed between the cylinders, called trim values (t). These are then combined to determine the individual valve lift required for each cylinder.

Considering FIG. 1 along with FIG. 2, the average desired fuel charge is determined for the given operating condition, based on the air flow meter 13 and the EGO sensor 16. A corrective factor sigma $\sigma$ is determined in process step 80 by a proportional plus integral controller. The corrective factor $\sigma$ is correlated to the average air/fuel ratio deviation from stoichiometric air/fuel ratio. In process step 84, the stoichiometric air/fuel ratio is divided into the mass air flow (MAF) to determine the reference fuel charge; and then multiplied by corrective factor $\sigma$, in step 86, to determine the corrected reference fuel charge. From the reference fuel charge, the average desired fuel charge per cylinder is determined, in process step 87.

Concurrently with the determination of the average desired fuel charge is the determination of the individual desired deviation in valve lift between the cylinders. The EGO signal is sampled by the EEC microprocessor 18, every 720/N degrees, where N is the number of cylinders in a conventional four stroke engine, and a variable $\theta$ is incremented by 720/N, which correlates to a particular cylinder combustion event, as shown in process step 88. The engine rotational position is determined from an engine event signal sent to the EEC microprocessor 18, from a sensor, not shown, mounted to the engine. This signal is used to correlate with cylinder combustion events. The air/fuel offset from stoichiometric is then determined and stored, as shown in process step 90. Process step 92 increments $\theta$ and returns to process step 88 until $\theta$ equals 720°. The stored values of the air/fuel offsets are then read, in step 94, and used to determine the trim values (t), as shown in process step 95. The results of steps 87 and 95 are then combined to produce the individual valve lift required for each cylinder, as shown in step 98. A correction signal is then generated by the EEC microprocessor 18, for correcting the valve lift.

In operation of this embodiment, the EGO sensor 16 monitors the exhaust gas and transmits an EGO signal to the EEC microprocessor 18. The EEC microprocessor 18 then determines the needed valve lift for each cylinder and sends a solenoid signal 96 to the solenoid driver, which controls the opening and closing of the solenoid valves 70 in the lost motion actuator 30.

Figure 4:
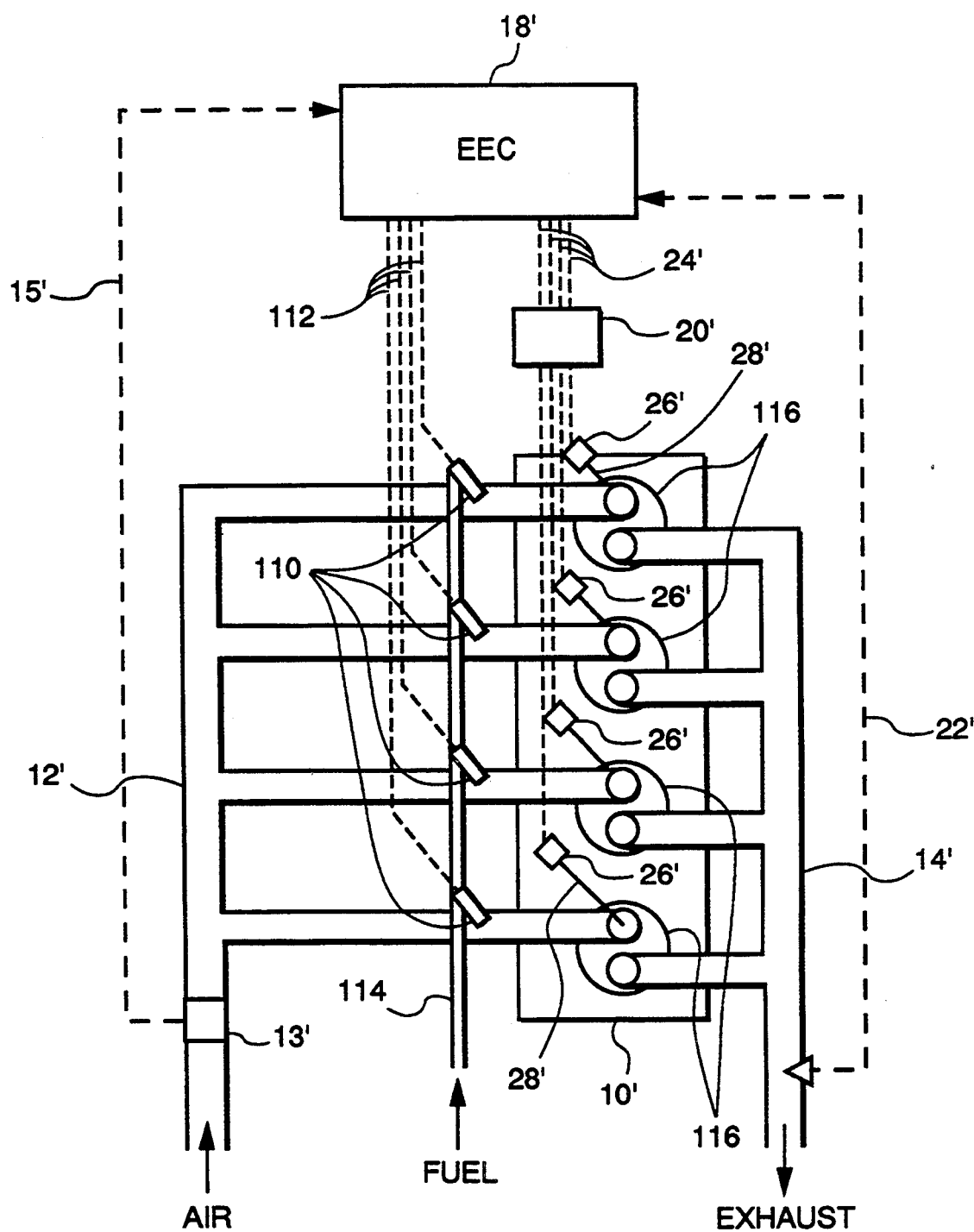
FIG. 4 is a block diagram of an alternative embodiment of the overall control system, incorporating fuel pulse width variations with the variable valve control.

A first alternative embodiment is shown in FIG. 4 wherein like numerals refer to like parts shown in FIG. 1. The structure is substantially similar to that shown in FIG. 1 with the exception that fuel injectors 110 are capable of producing variable width pulses of fuel between cylinders 116, and they are electrically coupled to the EEC microprocessor 18' via leads 112. A variable width fuel pulse system such as U.S. Pat. No. 4,962,741 Cook et al., herein incorporated by reference, can be used or any other suitable variable width fuel pulse system.

In operation, this embodiment operates similar to the first embodiment when the engine 10' is operating at part load, which does not require the maximum valve 28' lift. The amount of fuel 114 delivered to each fuel injector 110, the pulse width, is equal between the fuel injectors 110. On the other hand, when the engine 10' is operating at a condition requiring maximum valve 28' lift, the EEC microprocessor 18' determines the corrections needed for the various fuel charges, based on the signal from the EGO sensor 16' and the mass air flow meter 13'. The EEC microprocessor 18' varies the pulse widths of the fuel injectors 110, by sending out correction signals, to correct for air/fuel ratio variations between cylinders 116.

A further feature which may be incorporated into this first alternative embodiment is the capability to store the variations in fuel injector 110 pulse widths at maximum throttle, and use these variations of pulse widths between the fuel injectors 110 at part load, in order to account for fuel injector clogging.

A second alternative embodiment is also shown structurally in FIG. 4. This embodiment is the same as the first embodiment, except that if the variation of lift in a particular valve 28' is beyond predetermined acceptable limits of variation from the lift of the other valves 28', then the EEC microprocessor 18' sends out a correction signal to vary the fuel pulse width in the corresponding fuel injector 110.

Figure 5:
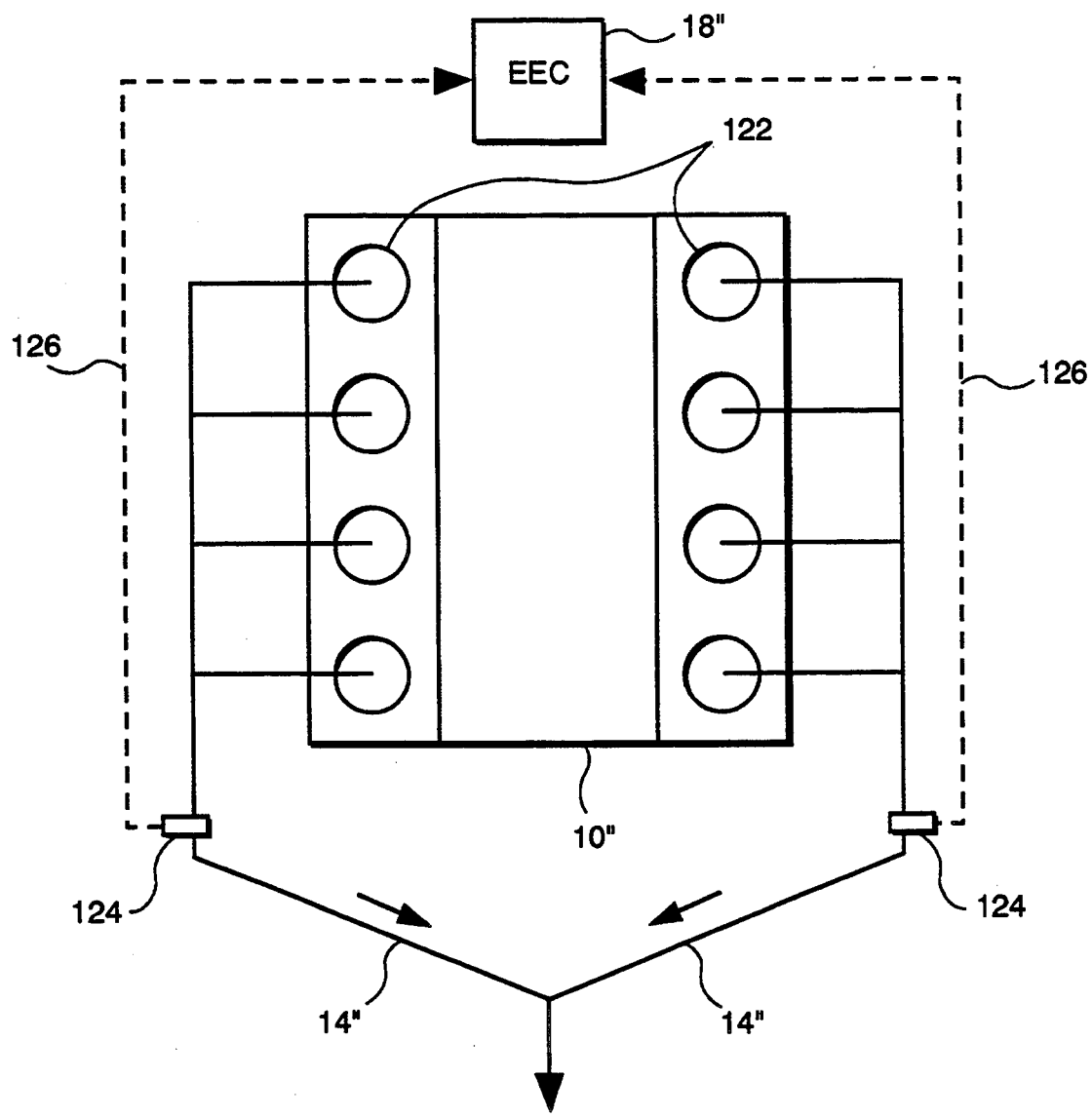
FIG. 5 is a block diagram of another alternative embodiment with a V-8 engine and two exhaust sensors, one for each bank of cylinders.

A third alternative embodiment is shown in FIG. 5. This is structurally similar to the first embodiment, except that the engine 10" has two banks of cylinders 122 with separate exhaust manifolds 14". Consequently the system incorporates two EGO sensors 124, with corresponding leads 126 to the EEC microprocessor 18", one for each corresponding exhaust manifold 14". The process steps for each bank of cylinders 122 are the same as in the first embodiment, resulting in two separate sets of calculations used to determine the valve lift, one for each corresponding bank 122.

A fourth alternative embodiment is structurally similar to the first embodiment shown in FIG. 1. In this embodiment, there is no solenoid driver 20, and the variable valve lift mechanism 26 consists of an electrohydraulic camless valve control system 128, such as in U.S. Pat. No. 4,000,756 Ule et al., incorporated herein by reference, or some other similar device. The valve lift correction developed by the EEC microprocessor 18 is combined with the average amount of valve lift and a signal is sent via lead 24 to the camless valve control system 128. This system electrically controls the amount and timing of valve lift.

Although particular embodiments of the present invention have been illustrated in the accompanying drawings and described in the foregoing detailed description, it is to be understood that the present invention is not to be limited to just the embodiments disclosed. Numerous rearrangements, modifications, and substitutes are possible without departing from the scope of the claims hereafter.

We claim:

1. A method of minimizing cylinder air/fuel ratio variation in a multi-cylinder engine having variable lift intake valves, comprising the steps of:
    sensing the oxygen ratio of a combined exhaust gas stream from a plurality of cylinders using a high speed sensor which generates a composite air/fuel ratio signal;
    monitoring the engine rotational position and cycle, to generate an engine event signal;
    analyzing said composite air/fuel ratio and engine event signals, and generating individual cylinder air/fuel ratio signals;
    controlling the air flow of each cylinder using the variable lift intake valves in response to said individual cylinder air/fuel ratio signals to adjust the air/fuel ratio;
    supplying fuel to each cylinder of the engine using a plurality of fuel injectors each coupled to a different cylinder using baseline fuel charges for a given operating condition;
    evaluating the cylinder to cylinder air/fuel ratio variations when the engine is operating at maximum valve lift, and generating correction signals for each cylinder;
    adjusting said fuel charges in each of the cylinders from said baseline level in response to said correction signals;
    storing the fuel charge correction signal for each cylinder; and
    modifying the fuel charges from baseline using the correction signal when operating in a variable lift mode.

2. The method of claim 1 wherein said analyzing step comprises sampling said composite air/fuel ratio signal once each time interval associated with a combustion event in one of the cylinders to generate N signals, wherein N is the number of cylinders producing exhaust gasses in the gas stream that pass by said sensor.

3. A method of minimizing cylinder to cylinder air/fuel ratio variation in a multi-cylinder engine having variable lift intake valves, comprising the steps of:
    sensing the oxygen ratio of a combined exhaust gas stream from a plurality of cylinders using high speed sensor which generates a composite air/fuel ratio signal;
    monitoring the engine rotational position and cycle, to generate an engine event signal;
    analyzing said composite air/fuel ratio and engine event signals, and generating individual cylinder air/fuel ratio signals;
    controlling the air flow of each cylinder using the variable lift intake valves in response to said individual cylinder air/fuel ratio signals to adjust the air/fuel ratio;
    supplying fuel to each cylinder of the engine using a plurality of fuel injectors each coupled to a different cylinder using baseline fuel charges for a given operating condition;
    evaluating the cylinder to cylinder air/fuel ratio variations when the engine is operating at maximum valve lift, and generating correction signals for each cylinder;
    adjusting said fuel charges in each of the cylinders from said baseline level in response to said correction signals;
    determining the amount of variation in intake valve lift between the independent variable lift intake valves;
    comparing said lift variation to a predetermined acceptable limit; and
    varying said individual cylinder fuel charge from baseline when said variation in lift is above said acceptable limit, thereby reducing said variation below the limit.

4. A method of minimizing cylinder to cylinder air/fuel ratio variation in a multi-cylinder engine having variable lift intake valves, comprising the steps of:
    sensing the oxygen ratio of a combined exhaust gas stream from a plurality of cylinders using a high speed sensor which generates a composite air/fuel ratio signal;
    monitoring the engine rotational position and cycle, to generate an engine event signal;
    analyzing said composite air/fuel ratio and engine event signals, and generating individual cylinder air/fuel ratio signals;
    controlling the air flow of each cylinder using the variable lift intake valves in response to said individual cylinder air/fuel ratio signals to adjust the air/fuel ratio;
    supplying fuel to each cylinder of the engine using a plurality of fuel injectors each coupled to a different cylinder using baseline fuel charges for a given operating condition;
    determining the amount of variation in intake valve lift between the independent variable lift intake valves;
    comparing said lift variation to a predetermined acceptable limit; and
    varying said individual cylinder fuel charge from baseline when said variation in lift is above said acceptable limit, thereby reducing said air/fuel ratio variation to an acceptable level.

5. A method of minimizing cylinder to cylinder air/fuel ratio variation in a multi-cylinder engine having variable lift intake valves, comprising the steps of:
    sensing the oxygen ratio of a combined exhaust gas stream from a plurality of cylinders using a high speed sensor which generates a composite air/fuel ratio signal;
    monitoring the engine rotational position and cycle, to generate an engine event signal;
    analyzing said composite air/fuel ratio and engine event signals, and generating individual cylinder air/fuel ratio signals;
    controlling the air flow of each cylinder using the variable lift intake valves, in conjunction with an engine driven camshaft and a lost motion mechanism, in response to said individual cylinder air/fuel ratio signals to adjust the air/fuel ration when the engine is operating at less than maximum valve lift;

supplying fuel to each cylinder of the engine using a plurality of fuel injectors each coupled to a different cylinder using baseline fuel charges for a given operating condition;

evaluating the cylinder to cylinder air/fuel ratio variations when the engine is operating at maximum valve lift and generating correction signals for each cylinder;

adjusting said fuel charges in each of the cylinders from said baseline level in response to said correction signals;

storing the fuel charge correction signal for each cylinder; and modifying the fuel charges from baseline using the correction signal when operating at less than maximum valve lift.

6. The method of claim 5 wherein the steps of storing and modifying the fuel correction signal comprises varying said individual cylinder fuel charge from baseline when said variation in lift is above said acceptable limit, thereby reducing said variation below the limit.

7. The method of claim 5 wherein said sensing step comprises sensing the oxygen ratios of two exhaust streams from a plurality of cylinders in a V engine having two banks of cylinders using two high speed sensors which generate two corresponding composite air/fuel ratio signals.

8. An apparatus for minimizing cylinder to cylinder air/fuel ratio variations in a multi-cylinder engine, said apparatus comprising:

an oxygen sensor, mounted within an exhaust stream from a plurality of cylinders, for sensing the exhaust gas oxygen ratio of the exhaust gasses, and generating a composite air/fuel ratio signal;

position sensing means for monitoring the engine rotational position and cycle, to generate a engine event signal;

a variable lift intake valve coupled to each cylinder of the engine;

means for analyzing said composite air/fuel ratio and said engine event signal, to determine the individual cylinder air/fuel ratios;

variable lift valve control means for individually controlling the variable lift intake valves in response to said individual air/fuel ratio signals to reduce cylinder to cylinder variation;

wherein the engine has a V configuration having two banks of cylinders and two separate corresponding exhaust streams, wherein said oxygen sensor comprises two oxygen sensors, one in each of said exhaust streams.

9. The apparatus of claim 8 further comprising:

a plurality of electronically actuated fuel injectors each coupled to a cylinder;

fuel correcting means for analyzing said individual air/fuel ratio signals and engine event signal when said engine is operated with said variable lift intake valves at maximum valve lift, to identify cylinder to cylinder air/fuel variability and to generate a corresponding fuel injector correction signal; and a fuel controller responsive to said fuel correcting means for electronically actuating said fuel injectors.

10. The apparatus of claim 8 wherein said plurality of variable lift intake valves comprise an engine driven camshaft and a lost motion variable valve lift mechanism.

11. An apparatus for minimizing cylinder to cylinder air/fuel ratio variations in a multi-cylinder in-line engine with only one exhaust stream said apparatus comprising:

a single oxygen sensor, mounted within an exhaust stream from a plurality of cylinders, placed in the exhaust stream at a point after exhaust gasses from all of the cylinders are combined into a single stream of gas, for sensing the exhaust gas oxygen ratio of the exhaust gasses, and generating a composite air/fuel ratio signal;

position sensing means for monitoring the engine rotational position and cycle, to generate a engine event signal;

a variable lift intake valve coupled to each cylinder of the engine, wherein said plurality of variable lift intake valves includes an engine driven camshaft and a lost motion variable valve lift mechanism;

means for analyzing said composite air/fuel ratio and said engine event signal, to determine the individual cylinder air/fuel ratios;

variable lift valve control means for individually controlling the variable lift intake valves in response to said individual air/fuel ratio signals to reduce cylinder to cylinder variation;

a plurality of electronically actuated fuel injectors each coupled to a cylinder;

fuel correcting means for analyzing said individual air/fuel ratio signals and engine event signal when said engine is operated with said variable lift intake valves at maximum valve lift, to identify cylinder to cylinder air/fuel variability and to generate a corresponding fuel injector correction signals;

a fuel controller responsive to said fuel correcting means for electronically actuating said fuel injectors;

means for determining the amount of variation in intake valve lift between said independent variable lift intake valves;

means for comparing said lift variation to a predetermined acceptable limit; and means for varying said individual cylinder fuel charge from baseline when said variation lift is above said acceptable limit, thereby reducing said variation below the limit.

12. An apparatus for minimizing cylinder to cylinder air/fuel ratio variations in a multi-cylinder engine, said apparatus comprising:

an oxygen sensor, mounted within an exhaust stream from a plurality of cylinders, for sensing the exhaust gas oxygen ratio of the exhaust gasses, and generating a composite air/fuel ratio signal;

position sensing means for monitoring the engine rotational position and cycle, to generate a engine event signal;

a variable lift intake valve coupled to each cylinder of the engine;

means for analyzing said composite air/fuel ratio and said engine event signal, to determine the individual cylinder air/fuel ratios;

variable lift valve control means for individually controlling the variable lift intake valves in response to said individual air/fuel ratio signals to reduce cylinder to cylinder variation;

a plurality of electronically actuated fuel injectors, each coupled to a cylinder, capable of producing variable fuel charges from a baseline fuel charge for a given operating condition;

means for determining the amount of variation in intake valve lift between said variable lift intake valves;

means for comparing said lift variation to a predetermined acceptable limit; and means for varying said individual cylinder fuel charge from baseline when said variation in lift is above said acceptable limit, thereby reducing said air/fuel ratio variation to an acceptable level.

13. The apparatus of claim 12 for use in an in-line engine with only one exhaust stream, wherein said oxygen sensor comprises only one oxygen sensor placed in the exhaust stream at a point after exhaust gasses from all of the cylinders are combined into a single stream of gas.

14. The apparatus of claim 12 wherein said variable lift valve control means comprises a direct electrohydraulic valve actuation mechanism.

15. The apparatus of claim 12 wherein said variable lift valve control means comprises a lost motion type variable valve control system.

\* \* \* \* \*